United States Patent [19]

Sowa et al.

[11] 3,873,515

[45] Mar. 25, 1975

[54] PROCESS FOR PRODUCING 2,2-ANHYDRO-(1-β-D-ARABINOFURANOSYL)CYTOSINE

[75] Inventors: Tuneo Sowa; Toshiatsu Kusaki; Kozo Tunoda; Norio Akimoto; Kunio Iithuka; Teruo Miyaji, all of Nobeoka, Japan

[73] Assignee: Asahi Kasei Kogyo Kabushiki Kaisha, Osaka, Japan

[22] Filed: Apr. 17, 1972

[21] Appl. No.: 244,557

[30] Foreign Application Priority Data
Apr. 15, 1971 Japan................................ 46-23482
Apr. 16, 1971 Japan................................ 46-23908

[52] U.S. Cl........................... 260/211.5 R, 424/180
[51] Int. Cl............................................ C07d 51/52
[58] Field of Search ............................ 260/211.5 R

[56] References Cited
UNITED STATES PATENTS
3,322,747  5/1967  Shen et al. .................. 260/211.5 R
3,755,296  8/1973  Kanai et al. ................. 260/211.5 R

*Primary Examiner*—Johnnie R. Brown
*Attorney, Agent, or Firm*—Armstrong, Nikaido & Wegner

[57] ABSTRACT

2,2'-Anhydro-(1-β-D-arabinofuranosyl)cytosine, which a chemotherapeutic agent against herpes simplex and vaccinia virus and can be easily and cheaply produced by reacting cytidine with thionyl chloride in a polar organic solvent, hydrolyzing the resulting compound, and heating the resulting 2',3'-O-sulfinylcytidine in an acidic aqueous medium.

7 Claims, 4 Drawing Figures

IR ABSORPTION SPECTRUM OF 2',3'-O-SULFINYL CYTIDINE HYDROCHLORIDE

IR ABSORPTION SPECTRUM OF CYTIDINE HYDROCHLORIDE

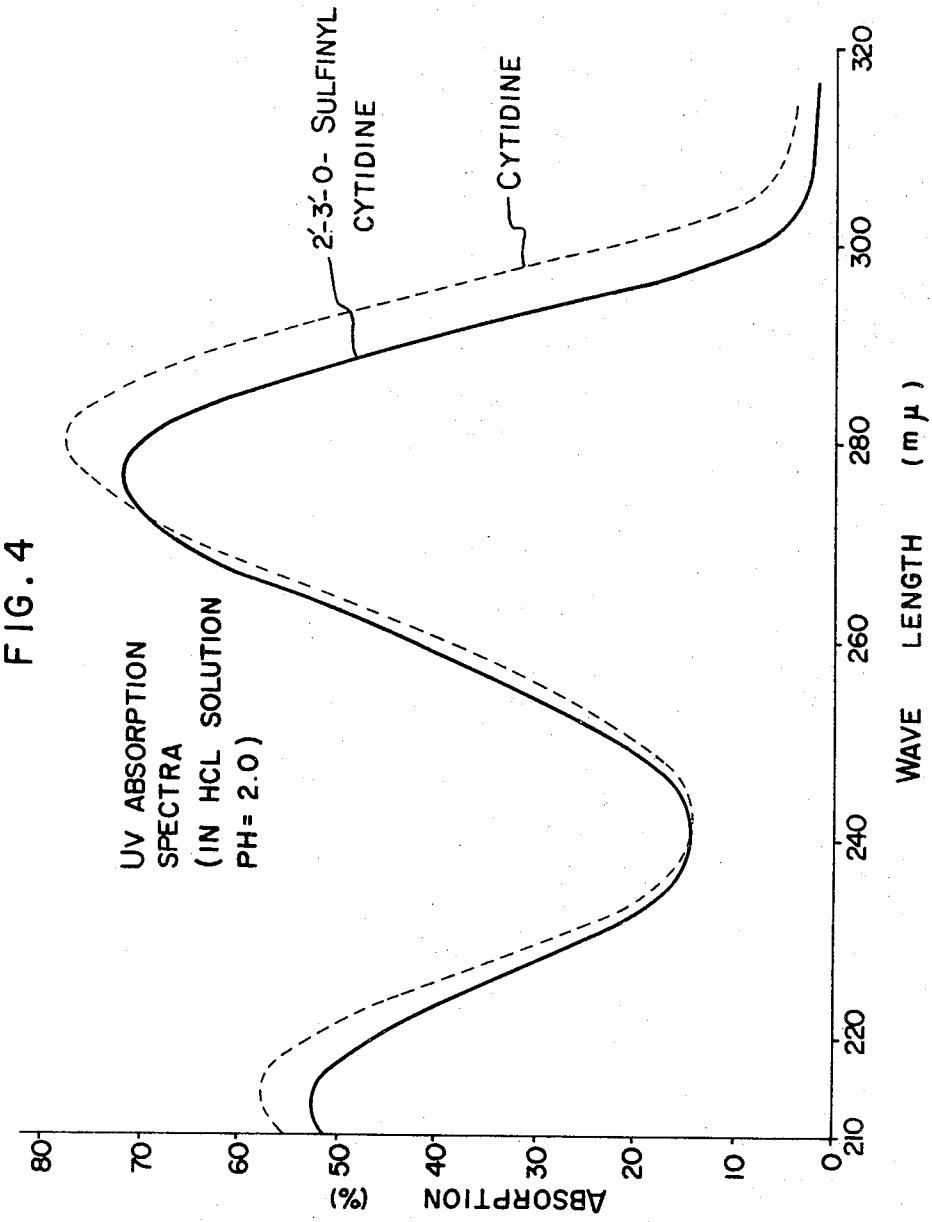

PROCESS FOR PRODUCING 2,2-ANHYDRO-(1-β-D-ARABINOFURANOSYL)CYTOSINE

The present invention relates to a novel process for producing 2,2'-anhydro-(1-β-D-arabinofuranozyl)cytosine represented by the formula,

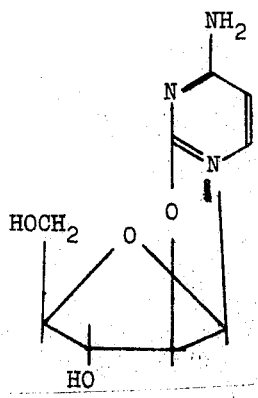

starting from cytidine. More particularly, the present invention relates to a process for easily and cheaply producing, on a commercial scale, 2,2'-anhydro-(1-β-D-arabinofuranosyl)cytosine which is useful as medicines such as a chemotherapeutic agent against herpes simplex and vaccinia virus or may be used as a starting material necessary for the production of various cytidine derivatives, for example, 1-β-D-arabinofuranosylcytosine.

There have heretofore been reported many processes for the synthesis of 1-β-D-arabinofuranosyl-cytosine such as, for example, the process of K. K. Ogilvie [Can.J. Chem., Vol. 47, page 495 (1961)] and the process of J. J. Fox [J. Amer. Chem. Soc., Vol. 79, page 2775 (1957)]. However, it is impossible to put these known processes into commercial practice since all of these processes have defects that very troublesome steps such as the introduction of a protective substituent and the release thereof are required; the reagents used in the reaction are expensive; and the yield of the desired 2,2'-anhydro-(1-β-D-arabinofuranosyl)cytosine is very low. Recently Ichino et al. (Tetrahedron Letters, 1970, page 867) have reported a simple process for producing 2,2'-anhydro-(1-β-D-arabinofuranosyl)cytosine which comprises treating cytidine with a Vilsmeier-Haark reagent formed from an acid chloride such as thionyl chloride, phosphorus oxychloride or phosgene and dimethylformamide. However, even the process of Ichino et al. has defects that the reaction yield is very low and it is very difficult to separate and purify the objective product from many by-products. Thus, the process of Ichino et al. is not necessarily an advantageous method.

It is an object of the present invention to avoid the difficulties heretofore encountered in the prior art processes for the production of 2,2'-anhydro-(1-β-D-arabinofuranosyl)cytosine.

It is a further object to provide a process for producing 2,2'-anhydro-(1-β-D-arabinofuranosyl)cytosine which is simple and inexpensive.

Another object of the present invention is to provide novel 2',3'-O-sulfinylcytidine.

Other objects and merits of the present invention will be apparent from the following description of the invention.

As a result of diversified studies, it has been found now that the above-mentioned defects of the prior art processes are obviated by producing 2,2'-anhydro-(1-β-D-arabinofuranosyl)cytosine starting from cytidine through 2', 3'-O-sulfinylcytidine.

More particularly, the present invention is directed to a novel process for producing 2,2'-anhydro-(1-β-D-arabinofuranosyl)cystosine represented by the formula,

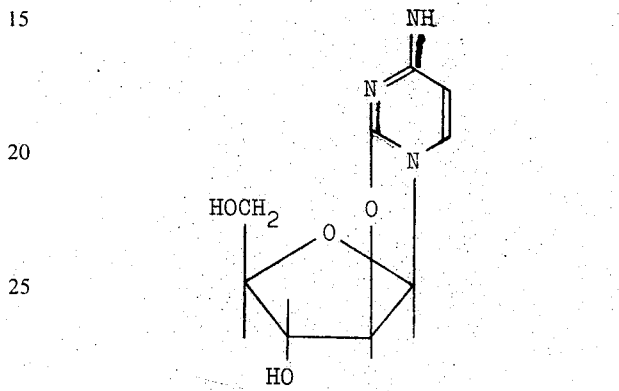

which comprises the steps of:

a. reacting cytidine with thionyl chloride in a polar organic solvent and hydrolyzing the resulting compound to produce novel 2',3'-O-sulfinylcytidine represented by the formula,

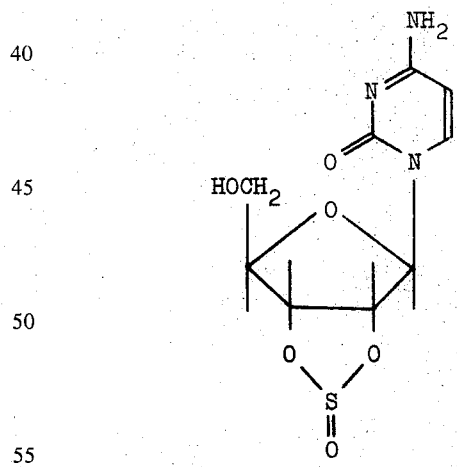

and b. heating the resulting 2',3'-O-sulfinylcytidine in an acidic aqueous medium.

In the first step of the process of the present invention, novel 2',3'-O-sulfinylcytidine, which has never been found in any literatures, is obtained in a high yield. The polar organic solvents which may be used in the first step include nitrile compounds such as acetonitrile, propionitrile, etc., nitro compounds such as nitromethane, nitroethane, nitropropane, nitrobenzene, etc.; cyclic ether compounds such as dioxane, tetrahydrofuran, etc.; and halogenated hydrocarbons such as dichloroethane, trichloroethane, etc. Ketones such as acetone, etc.; weakly basic amines such as dimethylformamide, etc. and basic amines such as pyridine, etc. are not preferable since they cause the formation of by-products and thereby extremely reduce the yield of the desired 2',3'-O-sulfinylcytidine. An amount of the polar organic solvents used in the first step is 0.5 to 5 liters, and preferably 2 to 3 liters, per mole of the starting cytidine. A larger amount of the polar organic solvents used than the necessary amount is not preferable, since it not only reduces the solubility of the starting cytidine in the reaction medium so as to reduce the reaction yield but also makes the separation of the desired product, 2',3'-O-sulfinylcytidine, difficult.

An amount of thionyl chloride used in the first step is one mole or more, and preferably 2 to 5 moles, per mole of the starting cytidine. The use of a larger amount of thionyl chloride has not a special effect on the reaction, but is not preferable since it not only is uneconomical but also makes the purification of the desired 2',3'-O-sulfinylcytidine difficult.

A solution of a mixture of cytidine and thionyl chloride in a polar organic solvent is reacted at a temperature of $-20°C$ to $+30°C$. If the reaction temperature is higher than required, by-products are formed and the yield of 2',3'-O-sulfinylcytidine is remarkably reduced.

The reaction time in the first step is suitably determined depending on the other reaction conditions such as, for example, an amount of thionyl chloride used, the reaction temperature, etc., but 0.5 to 5 hours is usually sufficient.

The obtained reaction liquid is added to cold water to effect hydrolysis. If necessary, an alkali such as sodium hydroxide is then added to neutralize the aqueous solution. After allowing the aqueous solution to stand overnight in a cold room, the separated crystals are then collected by filtration and dried. Thus, 2',3'-O-sulfinylcytidine can be obtained in the form of a free base or its hydrochloride salt.

2',3'-O-Sulfinylcytidine isolated as an intermediate product in the process of the present invention is explained referring to the accompanying drawings in which:

FIG. 4 is UV absorption spectrum of 2',3'-O-sulfinylcytidine and cytidine.

The 2',3'-O-sulfinylcytidine is a novel compound which has never been described in any literatures. For example, the 2',3'-O-sulfinylcytidine hydrochloride obtained in Example 1 has the following characteristics and is regarded as 2',3'-O-sulfinyl(1-β-D-ribofuranosyl)cytosine hydrochloride.

1. Elementary analysis values are as follows and are in agreement with the theoretical values of 2',3'-O-sulfinylcytidine hydrochloride salt.

Found: C: 33.3 %, H: 3.7 %, N: 12.3 %, S: 9.3 %, Cl: 10.5 %

Calculated for $C_9H_{11}O_6N_3S \cdot HCl$:
C: 33.2 %, H: 3.7 %, N: 12.9 %, S: 9.8 %, Cl: 10.8 %

Figure 1:
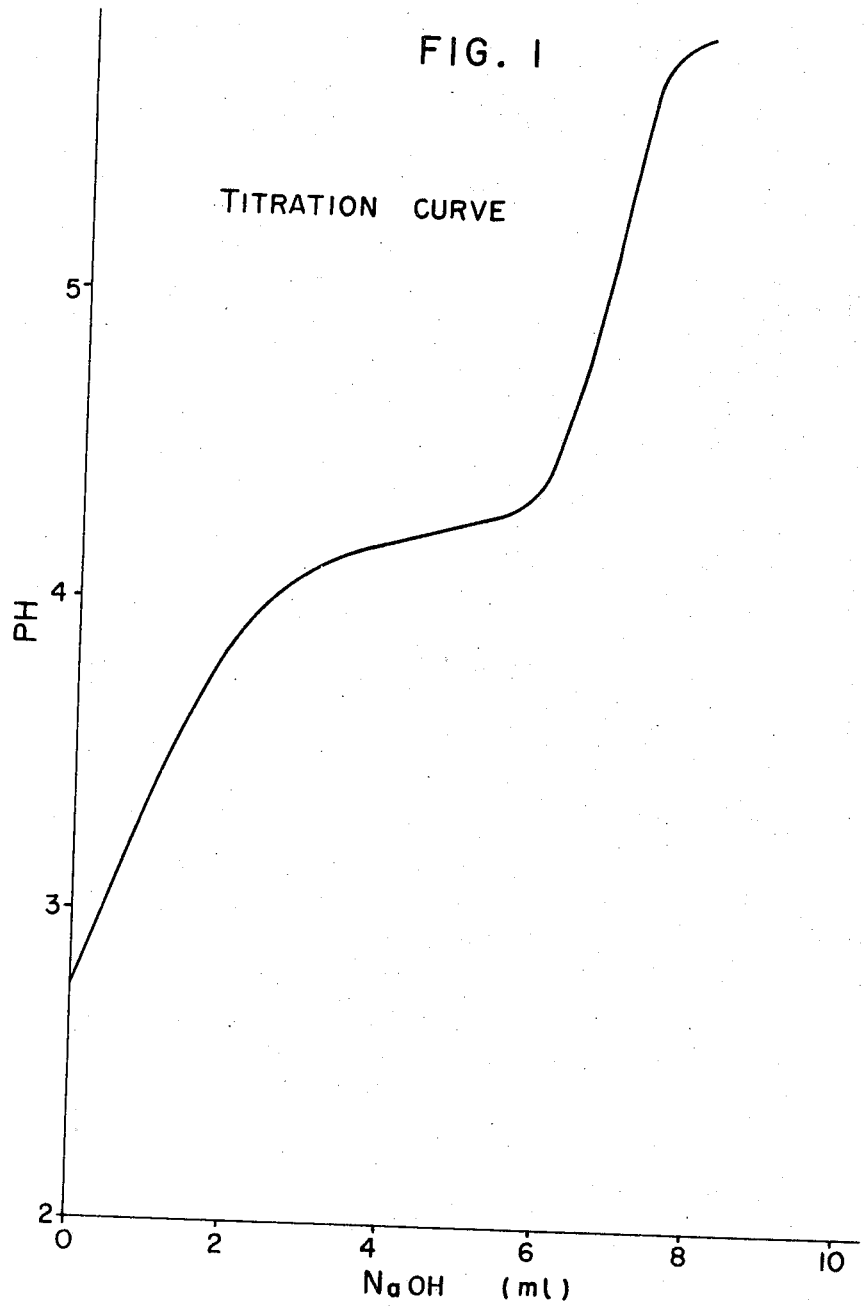
FIG. 1 is a titration curve obtained in the alkalimetry of the 2',3'-O-sulfinylcytidine crystals.

2. The titration curve obtained in the alkalimetry of this product is as shown in FIG. 1 and it is clear from the drawing that the product is a hydrochloride salt.

Figure 2:
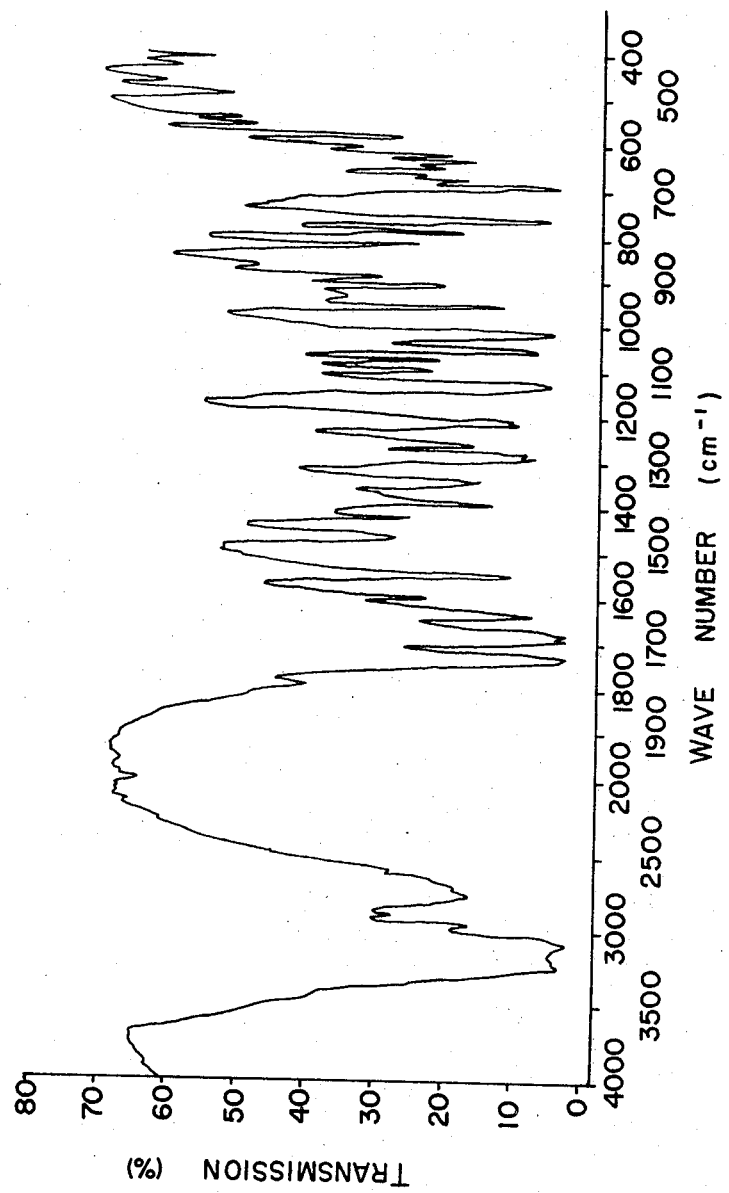
FIG. 2 is IR absorption spectrum of 2',3'-O-sulfinylcytidine hydrochloride.
Figure 3:
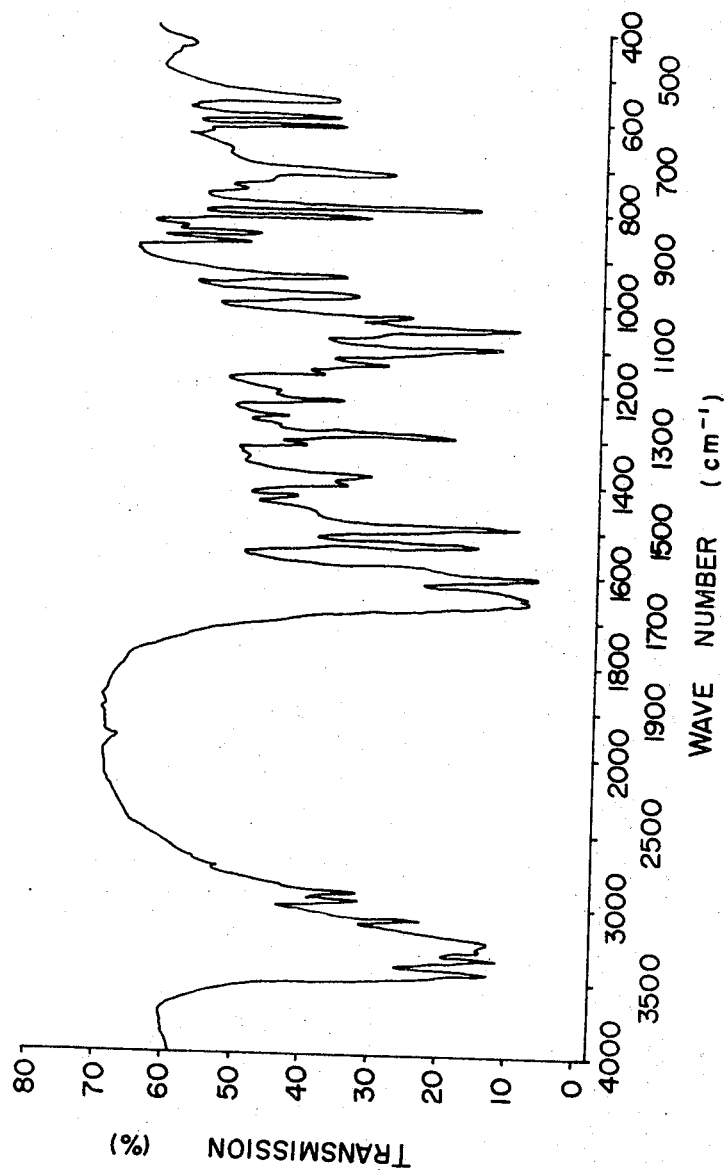
FIG. 3 is IR absorption spectrum of cytidine hydrochloride.

3. In the IR absorption spectrum of the product as shown in FIG. 2, absorption based on $S=O$ is found in the neighborhood of 1010, 1021 and 1053 $cm^{-1}$ and intense characteristic absorption of a five-membered heterocyclic ring-containing sulfite ester is found in the neighborhood of 1201, 1205 and 1210 $cm^{-1}$.

4. In paper chromatography (isopropanol: 1 M ammonium acetate (pH 4.0) = 7 : 3), a single spot having $R_f$ of 0.68 is observed. ($R_f$ in cytidine is 0.51.)

5. In the UV absorption spectrum of the product as shown in FIG. 4 the maximum absorption wave length ($\lambda_{max}$) is 278 m$\mu$ (at pH = 2.0) and $\lambda_{min}$ is 241 m$\mu$ (at pH = 2.0).

The second step wherein the desired 2,2'-anhydro-(1-β-D-arabinofuranosyl)cytosine is produced from the 2',3'-O-sulfinylcytidine obtained in the first step is then explained.

The desired 2,2'-anhydro-(1-β-D-arabinofuranosyl)cytosine can be produced in a very high yield by warming in water the 2',3'-O-sulfinylcytidine obtained in the first step. 2',3'-O-Sulfinylcytidine is particularly unstable to alkalis and forms various byproducts. Therefore, it is necessary to adjust the pH of the aqueous solution to 6.0 or less, and preferably 2.0 to 5.0, when 2',3'-O-sulfinylcytidine is warmed in water to produce 2,2'-anhydro-(1-β-D-arabinofuranosyl)cytosine. Also, when a reaction solvent is used in the second step, the reaction temperature is 50°C or higher and preferably 70° to 90°C.

An amount of water used as the reaction solvent in the second step is not critical. However, the use of a larger amount of water than required is not economical since the solvent should be removed by, for example, concentration when the desired 2,2'-anhydro-(1-β-D-arabinofuranosyl)-cytosine is purified and isolated.

The thus obtained reaction liquid containing 2,2'-anhydro-(1-β-D-arabinofuranosyl)cytosine may be directly cooled to precipitate 2,2'-anhydro-(1-β-D-arabinofuranosyl)cytosine crystals. Alternatively, after removing the solvent by, for example, concentration, an alcohol such as methanol is added to separate 2,2'-anhydro-(1-β-D-arabinofuranosyl)cytosine crystals.

It goes without saying that the first and second steps can be continuously carried out without isolating the 2',3'-O-sulfinylcytidine obtained in the first step if the reaction conditions are suitably selected.

The process of the present invention is very advantageous from a commercial point of view since the desired 2,2'-anhydro-(1-β-D-arabinofuranosyl)cytosine can be obtained from cytidine in a high yield by a very simple operation according to the process of the present invention.

Also, the 2,2'-anhydro-(1-β-D-arabinofuranosyl)cytosine obtained by the process of the present invention can be converted into 1-β-D-arabinofuranosylcytosine by a usual method such as hydrolysis in an aqueous alkali solution.

The following examples illustrate the present invention but should not be construed to limit the scope of the invention.

EXAMPLE 1

To 500 ml of acetonitrile were added 72 ml (1 mole) of thionyl chloride and 60 g of cytidine. The mixture was reacted at 5° to 7°C for about 3 hours with stirring. At first cytidine was suspended in the reaction medium, but the suspension turned a uniform light yellow clear solution with the progress of the reaction. The thus obtained reaction liquid (Conversion into 2′,3′-O-sulfinylcytidine : 97.5 %) was added to about 1.5 liter of ice water. Air was passed through the mixture for one hour with stirring. After allowing the mixture to stand overnight in a cold room, the separated crystals were collected by filtration and dried to give 61.5 g of 2′,3′-O-sulfinylcytidine hydrochloride crystals (Purity : 99.4 %). The filtrate contained 12.2 g of 2′,3′-O-sulfinylcytidine dissolved therein.

EXAMPLE 2

The reaction liquid (containing 68.1 g of 2′,3′-O-sulfinylcytidine) obtained in the same manner as in Example 1 was added to 1.5 liter of water. The pH of the mixture was adjusted to 4.8 by the addition of 1N aqueous sodium hydroxide at 10°C with stirring. After allowing the mixture to stand overnight in a cold room, the separated crystals were collected by filtration and dried to give 54.8 g of 2′,3′-O-sulfinylcytidine crystals (Purity : 97.8 %).

EXAMPLE 3

36 Milliliters (0.5 mole) of thionyl chloride was added to 700 ml of nitromethane, and 0.07 g (0.25 mole) of cytidine crystals were added with stirring. The mixture was reacted at 10°C for 2 hours. The reaction liquid was added to about 2 liters of water. The pH of the hydrolyzate liquid was adjusted to 3.5 by the addition of a 1N sodium hydroxide solution. Ethanol was then added. After allowing the mixture to stand overnight in a cold room, the separated crystals were collected by filtration and dried to give 49.5 g of 2′,3′-O-sulfinylcytidine crystals (Purity : 98.9 %). The filtrate contained 17.4 g of 2′,3′-O-sulfinylcytidine dissolved therein.

EXAMPLE 4

To 700 ml of dichloroethane were added 72 ml of thionyl chloride and 61 g of cytidine. The mixture was reacted at 5°C for 5 hours. The reaction liquid was added to about one liter of ice water. The pH of the mixture was adjusted to 4.0 by the addition of an aqueous sodium hydroxide solution. The dichloroethane was removed by concentration at a temperature of 30°C or less under reduced pressure. Allowing the concentrated mixture to stand overnight in a cold room, the separated crystals were collected by filtration and dried to give 50.3 g of 2′,3′-O-sulfinylcytidine crystals (Purity : 98.1 %).

EXAMPLE 5

To 500 ml of propionitrile were added 36 ml of thionyl chloride and 60 g of cytidine. The mixture was reacted at 5°C for 3 hours. The reaction liquid was treated in the same manner as in Example 1 to obtain 59.5 g of 2′,3′-O-sulfinylcytidine hydrochloride crystals (Purity : 98.9 %).

EXAMPLE 6

The procedures in Example 3 were repeated except that 700 ml of nitromethane was replaced by 1 liter of nitrobenzene. Thus, 47.3 g of 2′,3′-O-sulfinylcytidine crystals (Purity : 98.5 %) were obtained.

EXAMPLE 7

The procedures in Example 1 were repeated except that 500 ml of acetonitrile was replaced by 500 ml of nitrobenzene. Thus, 60.5 g of 2′,3′-O-sulfinylcytidine hydrochloride crystals having a purity of 97.3 % were obtained. The conversion into 2′,3′-O-sulfinylcytidine was 96.8 %.

EXAMPLE 8

33 Grams of 2′,3′-O-sulfinylcytidine hydrochloride crystals (Purity:99.4 %) as obtained in Example 1 were suspended in 100 ml of water. A 1N aqueous sodium hydroxide solution was added to the suspension to adjust the pH of the suspension to 5.0. Thus, the starting 2′,3′-O-sulfinylcytidine hydrochloride was completely dissolved. The solution was heated at 80°C for 4 hours. The pH of the reaction liquid was gradually reduced with the progress of the reaction to reach 3.0 after about one hour. Paper chromatography showed that the product consisted mainly of 2,2′-anhydro-(1-β-D-arabinofuranosyl)cytosine. From the measurement of the optical density of the product, the conversion into 2,2′-anhydro-(1-β-D-arabinofuranosyl)cytosine was found to be more than 95 %. The thus obtained reaction mixture was concentrated to dryness at a temperature lower than 40°C and 200 ml of ethanol was then added. The separated crystals were collected by filtration and dried to give 27.9 g of 2,2′ -anhydro-(1-β-D-arabinofuranosyl)cytosine sulfate crystals (Purity : 95.7 %).

EXAMPLE 9

To a suspension of 60 g of cytidine in 1 l of tetrahydrofuran was added dropwise 54 g of thionyl chloride at 10°C with stirring. The mixture was reacted for about 2.5 hours. The reaction mixture (Conversion into 2′,3′-O-sulfinylcytidine : 95.4 %) was added to 2 l of ice water to effect hydrolysis. A 1N aqueous ammonium hydroxide solution was then added to adjust the pH of the mixture to 4.0. The mixture was heated at 90°C for 1 hour. After cooling, the heated reaction mixture containing 48.5 g of 2,2′-anhydro-(1-β-D-arabinofuranosyl)cytosine (Conversion of 2′,3′-O-sulfinylcytidine:93.8 %) was then passed through a column packed with 350 ml of Amberlite 200 (H type), which is a trademark for a cation exchange resin manufactured by Rohm & Haas Co., U.S.A., and the resin was then washed with a 0.3 M sodium chloride solution. Fractions containing eluted 2,2′-anhydro-(1-β-D-arabinofuranosyl)cytosine were collected, concentrated and then treated in the same manner as in Example 8 to obtained 51.8 g of 2,2′-anhydro-(1-β-D-arabinofuranosyl)cytosine hydrochloride crystals (Purity : 98.4 %). Melting point : 262° – 264°C (dec.).

EXAMPLE 10

33 Grams of 2′,3′-O-sulfinylcytidine hydrochloride as obtained in Example 1 was suspended in 100 ml of water. The suspension was treated in the same manner as in Example 8 without neutralizing with sodium hydroxide. Thus, a reaction mixture containing 2,2′-anhydro-(1-β-D-arabinofuranosyl)cytosine. (Conversion into 2,2′-anhydro-(1-β-D-arabinofuranosyl)cytosine : 97.1 %) was obtained. The resulting reaction mixture was passed through a column packed with 200 ml of Amberlite 93 (acetic acid type), which is a trademark for an ion exchange resin manufactured by Rohm & Haas Co., U.S.A. The passed liquid and water wash liquids were collected, concentrated to dryness and then treated in the same manner as in Example 8. Thus, 21.5 g of 2,2'-anhydro-(1-β-D-arabinofuranosyl)cytosine acetate crystals having a purity of 99.4 % were obtained.

EXAMPLE 11

33 Grams (100 m moles) of 2',3'-O-sulfinylcytidine hydrochloride was suspended in about 70 ml of water. The pH of the suspension was adjusted to 4.0 with warming at 90°C. The suspension was warmed for about 2 hours. The pH of the resulting reaction liquid (Conversion into 2,2'-anhydro-(1-β-D-arabinofuranosyl)cytosine : 96.1 %) was adjusted to 2.0 by the addition of a small amount of sulfuric acid. The reaction liquid was treated in the same manner as in Example 8 to obtain 28.3 g of 2,2'-anhydro-(1-β-D-arabinofuranosyl)cytosine sulfate crystals (Purity : 96.9 %).

EXAMPLE 12

29 Grams (10 m moles) of 2',3'-O-sulfinylcytidine was suspended in about 100 ml of water. The pH of the suspension was adjusted to 5.0 by the addition of sodium hydroxide. The suspension was warmed at 70°C for 5 hours. The resulting reaction liquid was cooled to 5°C. The pH of the reaction liquid was then adjusted to 2.0 by the addition of hydrochloric acid. The reaction liquid was concentrated to dryness at a temperature of 40°C or less. About 150 ml of ethanol was added. The mixture was heated under reflux. The separated crystals were collected by filtration and dried to obtain 21.4 g of 2,2'-anhydro-(1-β-D-arabinofuranosyl)cytosine hydrochloride crystals [Purity: 98.1 %, melting point: 260° – 265°C (dec.)].

What is claimed is:

1. 2',3'-O-sulfinylcytidine represented by the formula,

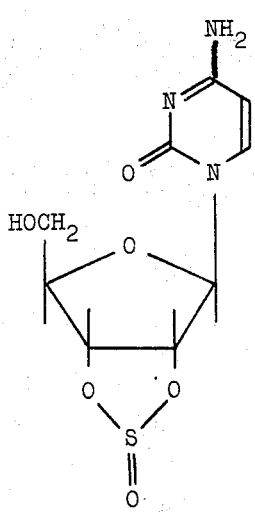

2. A process for producing 2,2'-anhydro-(1-β-D-arabinofuranosyl)cytosine of the formula

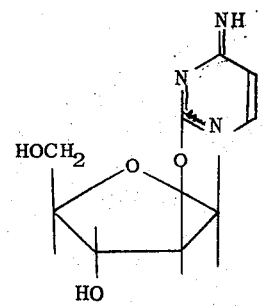

which comprises (a) treating cytidine with thionyl chloride in a polar organic solvent; (b) mixing the resultant solution with water whereby there is produced 2',3'-O-sulfinylcytidine of the formula

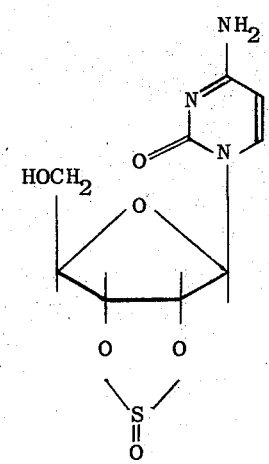

and (c) treating said 2',3'-O-sulfinylcytidine in an acidic aqueous medium at a temperature of 50° to 90°C, whereby said 2',3'-O-sulfinylcytidine is hydrolyzed to form said 2,2'-anhydro-(1-β-D-arabinofuranosyl)cytosine.

3. A process according to claim 2, wherein said polar organic solvent of step (a) is a nitrile compound, nitro compound, cyclic ether compound or halogenated hydrocarbon.

4. A process according to claim 2, wherein the amount of thionyl chloride of step (a) is 1 to 5 moles per mole of the starting cytidine.

5. A process according to claim 2, wherein step (a) is carried out at a temperature from −20° to 30°C.

6. A process according to claim 2, wherein step (c) is carried out at pH of 1.0 to 5.0.

7. A process according to claim 2, wherein the intermediate 2',3'-O-sulfinylcytidine produced in step (b) in the hydrolyzate liquid is treated in step (c) without isolation.

* * * * *